US006831643B2

(12) United States Patent
Aliaga et al.

(10) Patent No.: US 6,831,643 B2
(45) Date of Patent: Dec. 14, 2004

(54) METHOD AND SYSTEM FOR RECONSTRUCTING 3D INTERACTIVE WALKTHROUGHS OF REAL-WORLD ENVIRONMENTS

(75) Inventors: Daniel G. Aliaga, Millington, NJ (US); Ingrid B. Carlbom, Summit, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 305 days.

(21) Appl. No.: 10/122,337

(22) Filed: Apr. 16, 2002

(65) Prior Publication Data

US 2002/0176635 A1 Nov. 28, 2002

Related U.S. Application Data

(60) Provisional application No. 60/283,998, filed on Apr. 16, 2001, and provisional application No. 60/294,061, filed on May 29, 2001.

(51) Int. Cl.[7] .............................................. G06T 15/00
(52) U.S. Cl. ..................................................... 345/427
(58) Field of Search ................................ 345/419, 427; 382/154, 300

(56) References Cited

U.S. PATENT DOCUMENTS

| | | | |
|---|---|---|---|
| 5,920,376 A | | 7/1999 | Bruckstein et al. |
| 6,009,188 A | * | 12/1999 | Cohen et al. ............... 382/154 |
| 6,023,523 A | | 2/2000 | Cohen et al. |
| 6,097,394 A | | 8/2000 | Levoy et al. |
| 6,100,896 A | * | 8/2000 | Strohecker et al. ......... 345/427 |
| 6,118,474 A | | 9/2000 | Nayar |

OTHER PUBLICATIONS

S. E. Chen and L. Williams, "View Inrterpolation for Image Synthesis," Computer Graphics (SIGGRAP 1993), pp. 279–288, 1993.*

F. Bruckstein and T. Richardson, "Omniview Cameras with Curved Surface Mirrors," IEEE Workshop on Omnidirectional Vision, pp. 79–84, 2000.

S. Baker and S. Nayar, "A Theory of Catadioptric Image Formation," IEEE International Conference on Computer Vision, pp. 35–42, 1998.

S. Nayar, "Catadioptric Omnidirectional Camera", IEEE Conference on Computer Vision and Pattern Recognition, 1997, pp. 482–488.

"RemoteReality: 360° Immersive Imaging Solutions," HTML links to <http://www.remotereality.com> downloaded on Apr. 18, 2002.

R. Tsai, "A Versatile Camera Calibration Technique for High–Accuracy 3D Machine Vision Metrology Using Off–the–Shelf TV Cameras and Lenses," IEEE Journal on Robotics and Automation, RA–3:4, 1987, pp. 323–344.

"Chapter 15: Modeling of Data," pp. 656–706, of *Numerical Recipes in C* by W. Press, et al., Second Edition, Cambridge University Press, 1999.

(List continued on next page.)

*Primary Examiner*—Mark Zimmerman
*Assistant Examiner*—Peter-Anthony Pappas

(57) ABSTRACT

An omnidirectional video camera captures images of the environment while moving along several intersecting paths forming an irregular grid. These paths define the boundaries of a set of image loops within the environment. For arbitrary viewpoints within each image loop, a 4D plenoptic function may be reconstructed from the group of images captured at the loop boundary. For an observer viewpoint, a strip of pixels is extracted from an image in the loop in front of the observer and paired with a strip of pixels extracted from another image on the opposite side of the image loop. A new image is generated for an observer viewpoint by warping pairs of such strips of pixels according to the 4D plenoptic function, blending each pair, and then stitching the resulting strips of pixels together.

22 Claims, 12 Drawing Sheets

OTHER PUBLICATIONS

E. H. Adelson and J. Bergen, "The Plenoptic Function and the Elements of Early Vision," *Computational Models of Visual Processing*, MIT Press, Cambridge, MA, 3–20, 1991.

Chen S. E, "QuickTime VR—An Image–Based Approach to Virtual Environment Navigation", *Computer Graphics (SIGGRAPH '95)*, pp. 29–38, 1995.

R. Szeliski and H. Shum, "Creating full view panoramic image mosiacs and Environment Maps", *Computer Graphics (SIGGRAPH '97)*, pp. 251–258, 1997.

H. Shum and L. He, "Rendering with Concentric Mosaics" *Computer Graphics (SIGGRAPH '99)*, pp. 299–306, 1999.

S. Gortler et al., "The Lumigraph," *Computer Graphics (SIGGRAPH '96)*, pp. 43–54, 1996.

M. Levoy and P. Hanrahan, "Light Field Rendering," *Computer Graphics (SIGGRAPH '96)*, pp. 171–180, 1996.

L. McMillan and G. Bishop, "Plenoptic Modeling: An Image–Based Rendering System," *Computer Graphics (SIGGRAPH '95)*, pp. 39–46 1995.

D. Aliaga, "Accurate Catadioptric Calibration for Real–time Pose Estimation in Room–size Environments,", *IEEE International Conference on Computer Vision (ICCV '01)*, Jul. 2001, pp. 127–134.

S. Gottschalk et al., "OBBTree: A Hierarchical Structure for Rapid Interference Detection," *Computer Graphics (SIGGRAPH '96)*.

C. Tomasi and T. Kanade, "Shape and Motion from Image Streams: A Factorization Method," Cornell Technical Report 92–1270, Mar. 1992.

"KLT: An Implementation of the Kanade–Lucas–Tomasi Feature Tracker," <http://vision.stanford.edu/~birch/klt>, downloaded on Nov. 12, 2002.

D. Aliaga and I. Carlbom, "Plenoptic Stitching: A Scalable Method for Reconstructing Interactive Walkthroughs," *Computer Graphics (ACM SIGGRAPH '01 Proceedings)*, Aug. 2001, pp. 443–450.

\* cited by examiner

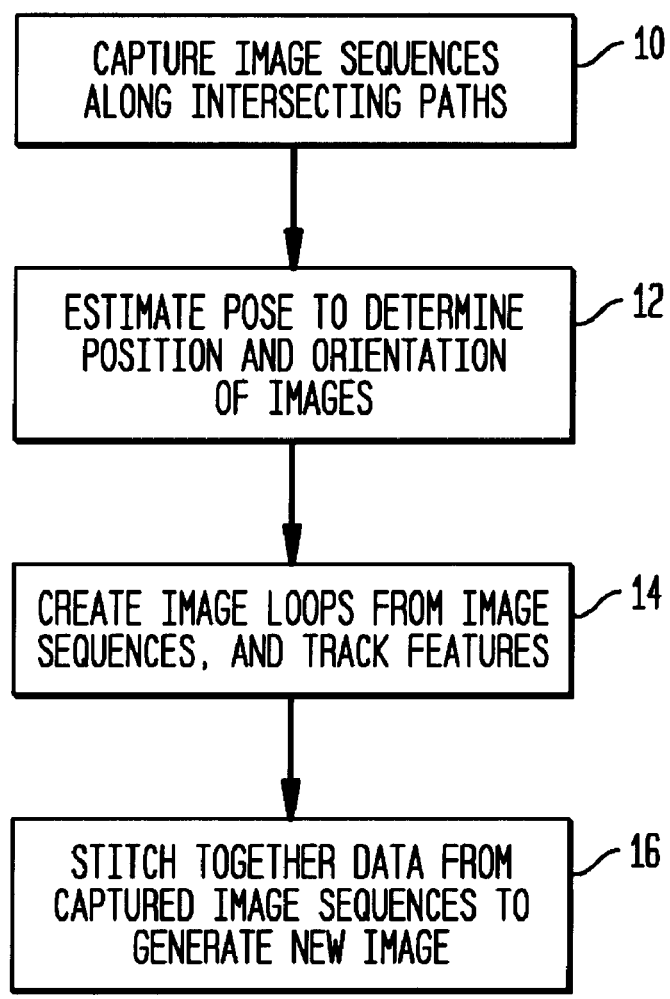

METHOD AND SYSTEM FOR RECONSTRUCTING 3D INTERACTIVE WALKTHROUGHS OF REAL-WORLD ENVIRONMENTS

CROSS-REFERENCE TO RELATED APPLICATIONS

This application claims the benefit of U.S. Provisional Application No. 60/283,998 filed Apr. 16, 2001 and U.S. Provisional Application No. 60/294,061 filed May 29, 2001, the contents of which are hereby incorporated by reference in their entireties.

BACKGROUND OF THE INVENTION

The present invention relates to the generation of virtual environments for interactive walkthrough applications, and more particularly, to a system and process for capturing a complex real-world environment and reconstructing a 4D plenoptic function supporting interactive walkthrough applications.

DESCRIPTION OF THE RELATED ART

Interactive walkthroughs are types of computer graphics applications, where an observer moves within a virtual environment. Interactive walkthroughs require detailed three-dimensional (3D) models of an environment. Traditionally, computer-aided design (CAD) systems are used to create the environment by specifying the geometry and material properties. Using a lighting model, the walkthrough application can render the environment from any vantage point. However, such conventional modeling techniques are very time consuming. Further, these techniques fail to adequately recreate the detailed geometry and lighting effects found in most real-world scenes.

Computer vision techniques attempt to create real-world models by automatically deriving the geometric and photometric properties from photographic images of the real-world objects. These techniques are often based on the process of establishing correspondences (e.g., stereo matching), a process that is inherently error prone. Further, stereo matching is not always reliable for matching a sufficient number of features from many images, in order to create detailed models of complex scenes.

Image-based rendering (IBR) has been used to create novel views of an environment directly from a set of existing images. For each new view, IBR reconstructs a continuous representation of a plenoptic function from a set of discrete image samples, thus avoiding the need to create an explicit geometric model.

A seven-dimensional (7D) plenoptic function was introduced by E. H. Adelson and J. Bergen in "The Plenoptic Function and the Elements of Early Vision," *Computational Models of Visual Processuig*, MIT Press, Cambridge, Mass., 3–20, 1991, which is hereby incorporated by reference in its entirety. The 7D plenoptic function describes the light intensity as viewed according to the following dimensions: viewpoint (quantified in three dimensions); direction (two dimensions); time; and wavelength. By restricting the problem to static scenes captured at one point in time, at fixed wavelengths (e.g., red, green, and blue), Adelson and Bergen's 7D plenoptic function can be reduced to five dimensions. In practice, all IBR techniques generate a plenoptic function, which is a subset of the complete 7D plenoptic function.

A 2D plenoptic function can be obtained by fixing the viewpoint and allowing only the viewing direction and zoom factor to change. Further, many 2D plenoptic function examples exist of IBR methods that stitch together both cylindrical and spherical panoramas from multiple images. Two such examples are described in the following articles: Chen S. E, "Quicktime VR—An Image-Based Approach to Virtual Environment Navigation", *Computer Graphics* (SIGGRAPH '95), pp. 29–38, 1995; and R. Szeliski and H. Shum, "Creating full view panoramic image mosaics and texture-mapped models", *Computer Graphics* (SIGGRAPH '97), pp. 251–258, 1997.

A method using concentric mosaics, which is disclosed in "Rendering with Concentric Mosaics" by H. Shum and L. He, *Computer Graphics* (SIGGRAPH '99), pp. 299–306, 1999, captures an inside-looking-out 3D plenoptic function by mechanically constraining camera motion to planar concentric circles. Subsequently, novel images are reconstructed from viewpoints, restricted within the circle and having horizontal-only parallax. Similar to the above-mentioned 2D plenoptic modeling, the viewpoint is severely restricted in this method.

The Lumigraph and Lightfield techniques reconstruct a 4D plenoptic function for unobstructed spaces, where either the scene or the viewpoint is roughly constrained to a box. The Luinigraph technique is described in the paper, "The Lumigraph," by S. Gortler et al. *Computer Graphics* (SIGGRAPH '96), pp. 43–54, 1996, and in U.S. Pat. No. 6,023,523, issued Feb. 8, 2000. The Lightfield technique is disclosed in a paper entitled "Light Field Rendering," by M. Levoy and P. Hanrahan, *Computer Graphics* (SIGGRAPH '96), pp. 171–80, 1996, and in U.S. Pat. No. 6,097,394, issued Aug. 1, 2000. Each of these methods captures a large number of images from known positions in the environment, and creates a 4D database of light rays. The recorded light rays are retrieved from the database when a new viewpoint is rendered. These Lumigraph and Lightfield methods of IBR allow for large models to be stitched together, but their capture is very time-consuming, and the models, so far, are restricted to small regular areas.

A technique for reconstructing a 5D plenoptic function, using images supplemented with depth values, has been described by L. McMilan and G. Bishop in "Plenoptic Modeling: An Image-Based Rendering System," *Computer Graphics* (SIGGRAPH '95), pp. 39–46 1995. McMillan and Bishop's technique formulates an efficient image warping operation that uses a reference image to create images for a small nearby viewing area. For real-world environments, depth is computed by manually establishing feature correspondences between two cylindrical projections captured with a small baseline. In this method, expansion to larger environments involves sampling many images from pre-set, closely-spaced viewpoints. Other IBR techniques using 5D functions are also known in the art.

The full 5D plenoptic function, in theory, can reconstruct large, complex environments. However, such 5D representations require the difficult task of recovering depth, which is often error prone and not robust enough to reconstruct detailed complex scenes.

SUMMARY OF THE INVENTION

The present invention provides an IBR system and method for performing "Plenoptic Stitching," which reconstructs a 4D plenoptic function suitable for walkthrough applications. The present invention reduces the 7D plenoptic function to a 4D function by fixing time, wavelength, and restricting viewpoints to lie within a common plane.

In the present invention, the set of images required for rendering a large, complex real-world environment can be captured very quickly, usually in a manner of minutes. Further, after initialization of the system, all of the processing is performed automatically, and does not require user intervention.

According to an exemplary embodiment of the present invention, images of the environment are acquired by moving a video camera along several intersecting paths. The motion of the camera is restricted to a plane. The intersecting paths form an irregular grid consisting of a group of tiled image loops.

At run-time, a virtual user moves within any of these image loops, and the Plenoptic Stitching process of the invention generates an image representing the user's view of the environment. The image is generated by "stitching" together pixel data from images captured along the boundaries of the loop.

The user is able to move freely from one image loop to the next, thereby exploring the environment. By tiling an environment with relatively constant-sized image loops, an environment of any size and shape can be reconstructed using a memory footprint whose size remains approximately constant throughout processing.

BRIEF DESCRIPTION OF THE DRAWINGS

The present invention will become more fully understood from the detailed description given below and the accompanying drawings, which are given for purposes of illustration only, and thus do not limit the present invention.

FIG. 1A illustrates the overall Plenoptic Stitching process of the present invention.

DETAILED DESCRIPTION OF THE INVENTION

Overview

The present invention is directed to a system and method for implementing an interactive walkthrough application, where the view of an observer walking through an unobstructed area of a complex environment is rendered according to a reconstructed 4D plenoptic function. FIG. 1A illustrates the overall process of generating an image of this view, called Plenoptic Stitching. As illustrated in step 10, a video camera is used to capture image sequences along several intersecting paths. After the images are captured and stored, or alternatively, as the images are being captured, a pose estimation algorithm is executed to determine the position and orientation of the camera for each image, as shown in step 12. Subsequently, the image sequences are used to create image loops, and small visually distinct environment features (e.g., points, corners, patterns) are tracked among each image loop in step 14. Novel images of the environment are generated by stitching together data from the captured image sequences in step 16. These steps will be discussed in greater detail below, according to an exemplary embodiment.

Image Loop Definition

Figure 2:
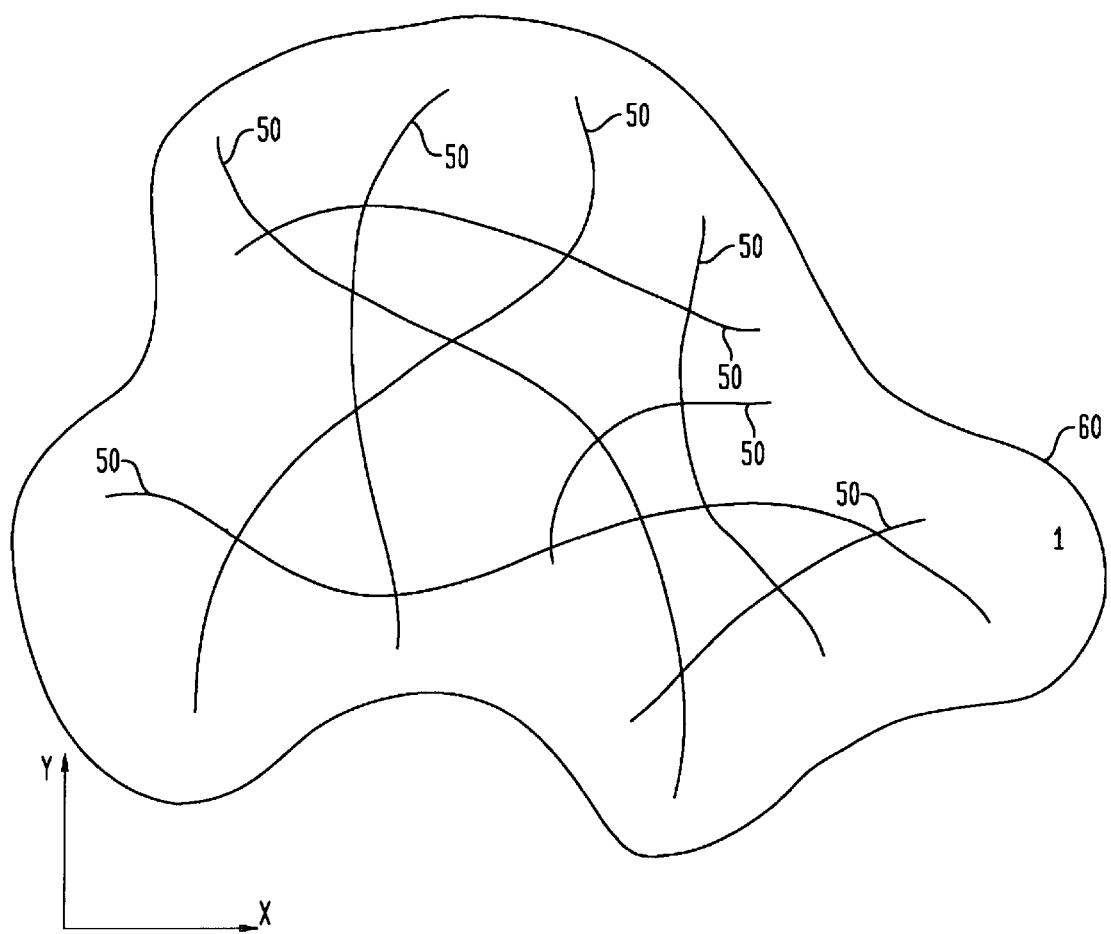
FIG. 2 illustrates an irregular grid formed by the intersecting paths in the environment from which images are captured.
Figure 4:
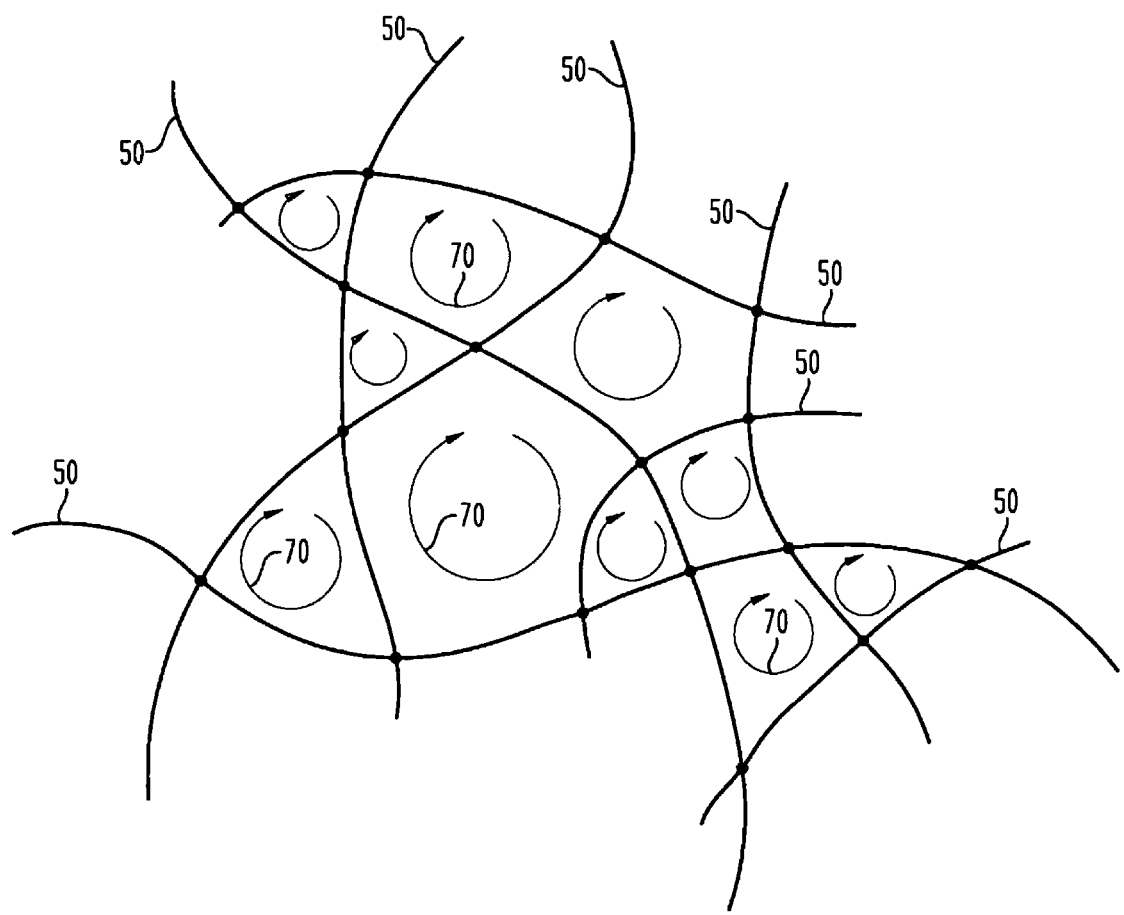
FIG. 4 illustrates the closed image loops defined by the intersecting paths within an irregular grid.

The paths along which the images are captured in step 10 form an irregular grid over the observer plane (x, y). An example of an irregular grid is illustrated in FIG. 2. The image paths 50 intersect each other, defining a set of closed image loops within the grid. FIG. 4 illustrates a set of image loops 70 defined within the grid of FIG. 2. The vertices of each image loop 70 are represented by intersections of image paths 50, while the edges of the loop 70 correspond to the path segments between two intersections. As shown, the image paths 50 are determined such that the grid adapts to the size, shape, and complexity of the perimeter 60 of environment 1. An image path 50 consists of a sequence of captured images that, according to an exemplary embodiment, are annotated with their position and orientation, and are approximately evenly spaced in the observer plane (x, y).

Plenoptic Stitching Details

An image of a novel view for an arbitrary viewpoint inside the loop 70 is generated by stitching together pixel data from the captured images of the loop according to a 4D plenoptic function constructed for the interior of the loop. The 4D plenoptic function represents light rays in the environment according to the parameters (x, y, u, ʋ). Specifically, these parameters identify the intersection of light beams with the observer plane (x, y) and a secondary surface (u, ʋ). The observer plane is typically, but not necessarily, parallel to the ground plane (i.e., horizontal). Further, the observer plane is set at a fixed height, which typically, but not necessarily, corresponds to the eye-height of an arbitrary observer who is "walking through" the environment 1. One possible way of defining the secondary surface is to sweep a line perpendicular to the observer plane around the perimeter 60 of the environment 1.

Figure 3:
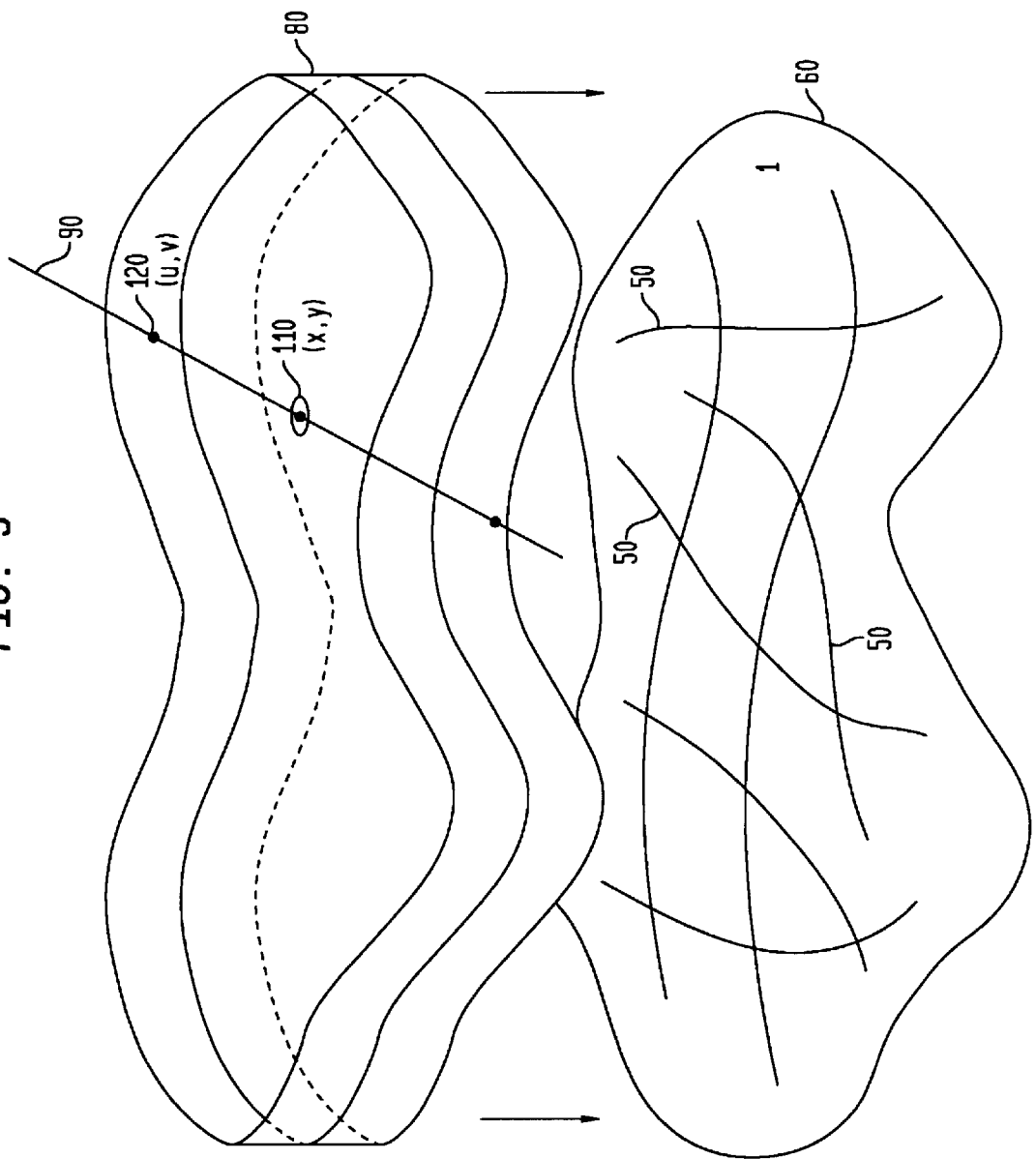
FIG. 3 illustrates a secondary surface surrounding an unobstructed space, which is used to parameterize light rays.

FIG. 3 illustrates a light ray 90, which is parameterized according to its intersection with the observer plane at 110 (i.e., the observer's viewpoint), and its intersection with the secondary surface 80 at 120. In FIG. 3, when an observer in an interactive walkthrough application is located at coordinates (x, y) of the observer plane, the light ray 90 will be projected onto an imaging surface.

The Plenoptic Stitching algorithm of the present invention reconstructs a novel image of the environment on an imaging surface, which may be planar, cylindrical, or representative of any other type of projection, which will be readily apparent to those of ordinary skill in the art. The imaging surface spans a particular field-of-view (FOV) in front of the observer and is created by stitching together strips of pixels from the images of the surrounding image loop. To do this, the algorithm defines a viewing frustum as a generalized cone radiating from the observer's viewpoint 110 to the convex hull of the imaging surface.

The algorithm orthographically projects the viewing frustum onto the observer plane, and defines a set of Stitching lines that lie in the observer plane, extending through the viewpoint 110, and spanning the extent of projection of the viewing frustum. Each line corresponds to one strip of the imaging surface. The strips, when stitched together, form the reconstructed image. The remainder of the algorithm is concerned with computing, for each Stitching line, a strip of pixels, which sample the environment. As will be readily apparent to those skilled in the art, other methods exist to obtain a set of lines similar to the Stitching lines. Such variations are not to be regarded as a departure from the spirit and scope of the present invention.

Figure 5:
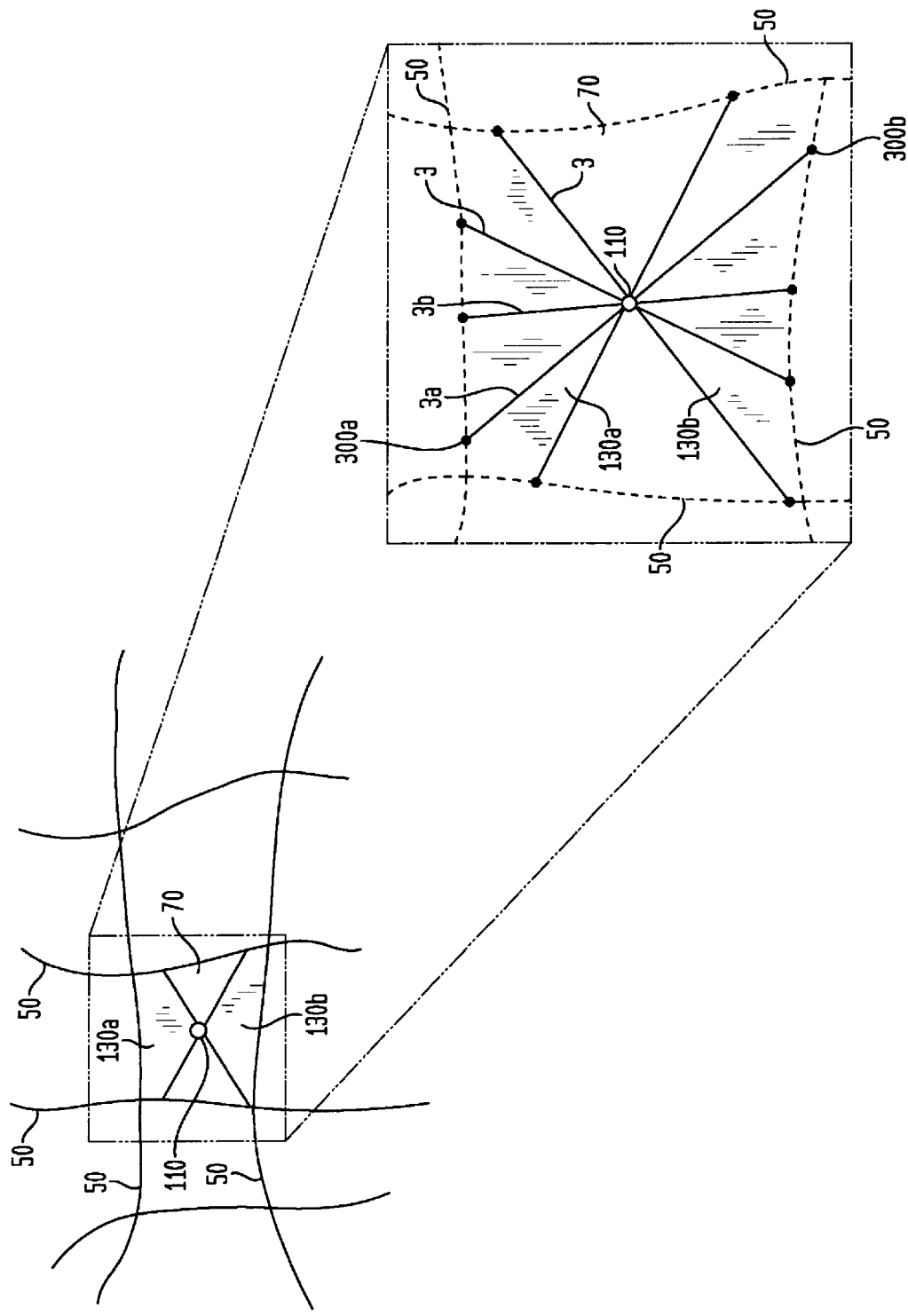
FIG. 5 illustrates Stitching lines extending through a viewpoint within an image loop, which are used to extract strips of pixels from the surrounding omnidirectional images.

FIG. 5 illustrates an arbitrary observer viewpoint 110 within an image loop 70. As previously stated, each reconstructed view is formed by a collection of strips of pixels, each strip defined by a Stitching line. Line segments 3 represent the subsets of these Stitching lines that lie within the loop and intersect the loop boundaries. Line segment 3a intersects the loop at points 300a and 300b. Line segment 3b shows the intersection of the observer's (center) viewing direction with the loop. The shaded area 130a represents the forward view, and the shaded area 130b represents the opposite (reverse) view.

It should be noted that for non-convex image loops 70, a line segment 3 might intersect the loop at more than two points. When this occurs, the two closest intersecting points from opposite sides of the loop 70 are used.

Each strip of pixels for viewpoint 110 is constructed using the images captured at each of the two intersection points of the corresponding line segment 3 with image loop 70. For example, images captured at points 300a and 300b of FIG. 5 will be used to reconstruct the new strip of pixels corresponding to line segment 3a. If no image was captured at the exact intersection point, the closest images to the intersection point are used.

In planar and cylindrical image projections, each Stitching line corresponds to a column of pixels in the reconstructed image. Accordingly, these types of images are generated column-by-column. However, for other types of projections (e.g., spherical), the Stitching lines do not necessarily correspond to columns.

Omnidirectional Camera

In an exemplary embodiment, the Plenoptic Stitching algorithm illustrated in FIG. 1A uses an omnidirectional video camera. For interactive walkthrough applications, it is preferable for a camera to have a field-of-view (FOV) as close as possible to a true omnidirectional FOV (e.g., can see in all directions around the camera). However, the present invention is not limited to a particular type of omnidirectional camera, or even to the use of an omnidirectional camera. While the use of an omnidirectional camera makes the image capture process easier, it will be readily apparent to those of ordinary skilled in the art that an omnidirectional camera is not required for the present invention.

Plenoptic Stitching Using Omnidirectional Images

In an exemplary embodiment in which an omnidirectional camera is used, the Plenoptic Stitching algorithm extracts a radial line of pixels parallel to the corresponding Stitching line from each of the omnidirectional images at or close to the intersection between the Stitching line and the boundaries of the image loop 70. If no single radial line of pixels is exactly parallel to the Stitching line, the two radial lines that are nearest to parallel to the Stitching lines are used. Each radial line of pixels contains a set of coefficients (pixel values) that sample a strip of the environment perpendicular to the observer plane (e.g., for a horizontal observer plane, each radial line of pixels samples a vertical strip of the environment).

The present invention constructs a new radial line of pixels for each line segment 3. This radial line of pixels is constructed from the pair of radial lines extracted from images at two sides of the loop 70. The new radial lines of pixels correspond to samplings of the environment that are perpendicular to the observer plane, and are viewed from the (new) observer viewpoint 110. To construct the new radial line, visible and easily discernible environment features (e.g., corners, edges, patterns) common to the extracted pair of radial lines are mapped to their location within the new radial line. This mapping is then used to warp the radial lines of pixels from the captured images to the imaging surface of the observer viewpoint. This process of constructing each radial line of pixels for the new image is described in more detail in the Image Reconstruction section below.

In an exemplary embodiment using planar or cylindrical image projections, each image column (or strip) is generated by warping the pixels of the associated pair of radial lines using the aforementioned mapping, and then blending the warped pixels together. The image columns are then "stitched together" i.e., displayed side by side in order to show the overall reconstructed image. A more detailed description of this process will be discussed below.

Image Capture

Figure 8:
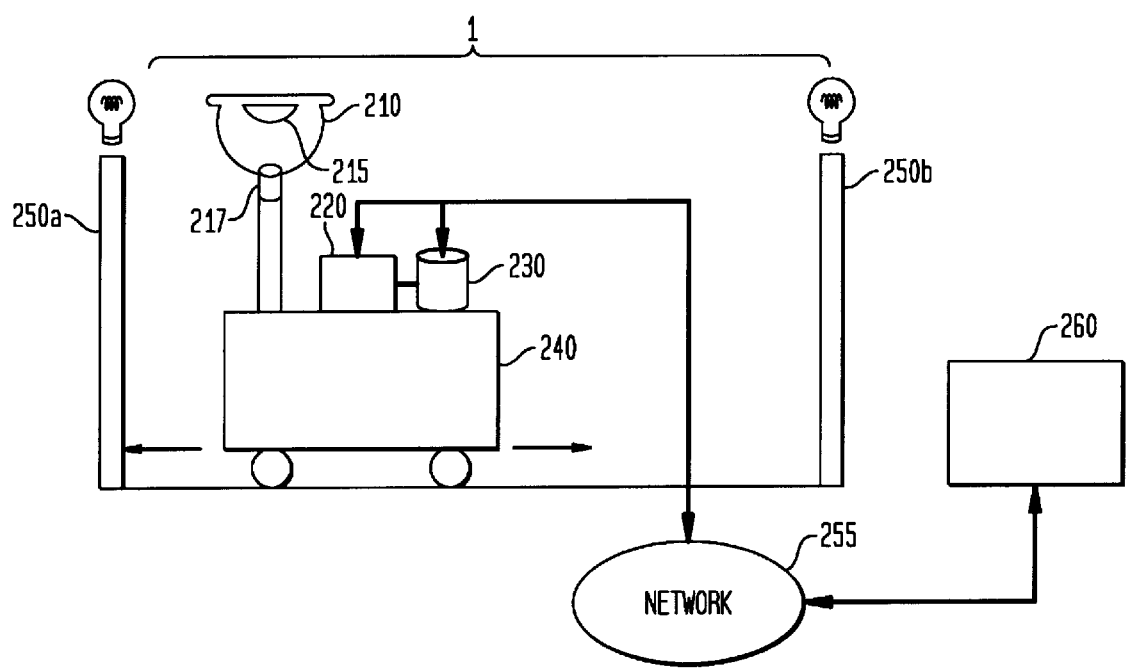
FIG. 8 illustrates a system for capturing omnidirectional images along the image paths.

FIG. 8 illustrates a system for performing the image capture required by step 10 of FIG. 1A of the Plenoptic Stitching algorithm according to the present invention. It should be noted that this figure and the following description provides an exemplary system for capturing images according to the present invention, and is in no way limiting. The present invention may be applied to any known type of camera having a field of view including a plurality of viewing directions.

In the embodiment illustrated in FIG. 8, an omnidirectional camera 210 is used for capturing images. The omnidirectional camera 210 may include a paraboloidal catadioptric design, such as that proposed by S. Nayar, as disclosed in U.S. Pat. No. 6,118,474, which is hereby incorporated by reference in its entirety. According to an exemplary embodiment, the camera 210 includes a convex paraboloidal mirror 215 (i.e., a mirror whose reflective-side is convex and whose focal point of the mirror is behind the reflective-side) placed in the field-of-view of a video camera 217 equipped with a lens system that images a nearly orthographic projection of the mirror surface. Therefore, a full hemisphere of the FOV (360 by 180 degrees) in front of the mirror's reflective surface is reflected onto the camera's image plane, parallel to and lying in front of the mirror 215. Since the horizon is located at the outer border of the mirror 215, the vertical FOV spans 0 to −90 degrees.

Each captured omnidirectional image has a substantially single center-of-projection (COP), which yields simple transformations for obtaining several types of projections (planar, cylindrical, etc.). In a further exemplary embodiment, the camera 217 installed in front of the paraboloidal mirror 215 may comprise a 3-CCD color video camera, or any other appropriate digitizing camera, as will be contemplated by those ordinarily skilled in the art.

Omnidirectional camera 210 is conveyed along the image paths 50 by a conveyance system 240. The camera 210 is set on top of the conveyance system 240 at a fixed height. Omnidirectional camera 210 is connected to a frame grabbing unit 220, and storage device 230 for storing the captured images. A control device 260 is also connected to the frame grabbing system 220 and storage device 230 via a network 255. The system further includes two beacons 250a, 250b for estimating position and orientation of the omnidirectional camera 210.

In an exemplary embodiment, the conveyance system 240 is a motorized cart powered by a battery. The motorized cart may be radio-controlled, to prevent cables or a cart operator from appearing in the captured images. Preferably, the conveyance system 240 will travel at a speed predetermined according to the rate that images are captured and transferred to the data storage device 230, such that the sequence of captured images corresponding to a particular image path 50 will be recorded with small inter-image spacings. For instance, a capture rate equivalent to an observer walling at about one meter/second (m/s) capturing images at a standard video rate of approximately 30 Hz yields images that are spaced apart by a few centimeters. Other forms of conveyance, and methods for controlling the conveyance, may be used in the present invention to transport the camera 210 along the image paths 50.

In an exemplary embodiment, the frame-grabbing unit 220 may include a computer equipped with a frame-grabbing card. The frame-grabbing unit 220 is conveyed along with the omnidirectional camera 210 by conveyance system 240. In such an embodiment, the frame-grabbing unit 220 receives instructions from the control device 260 via network 255, which may comprise wireless Ethernet, or any other type of wired or wireless network. In an alternative embodiment, the frame-grabbing unit 220 is located remotely from the omnidirectional camera 210, and may be situated proximate to, or integrated with, the control device 260. In this embodiment, the frame-grabbing unit 220 captures images received from the camera 210 via the network connection.

The control device 260 preferably includes a computer executing software to control the frame-grabbing unit 220 to capture the images from the camera 210 and store them in the data storage device 230. The control device 260 may also be used to control the conveyance system 240 to travel along the determined image paths 50.

The data storage device 230 preferably allows rapid access and storage of data. Similar to the frame-grabbing unit 220, the data storage device 230 may be situated in the conveyance system 240 with the camera 210, or alternatively, it may be located nearby the control device, or in any other nearby area.

Processing System

Figure 9:
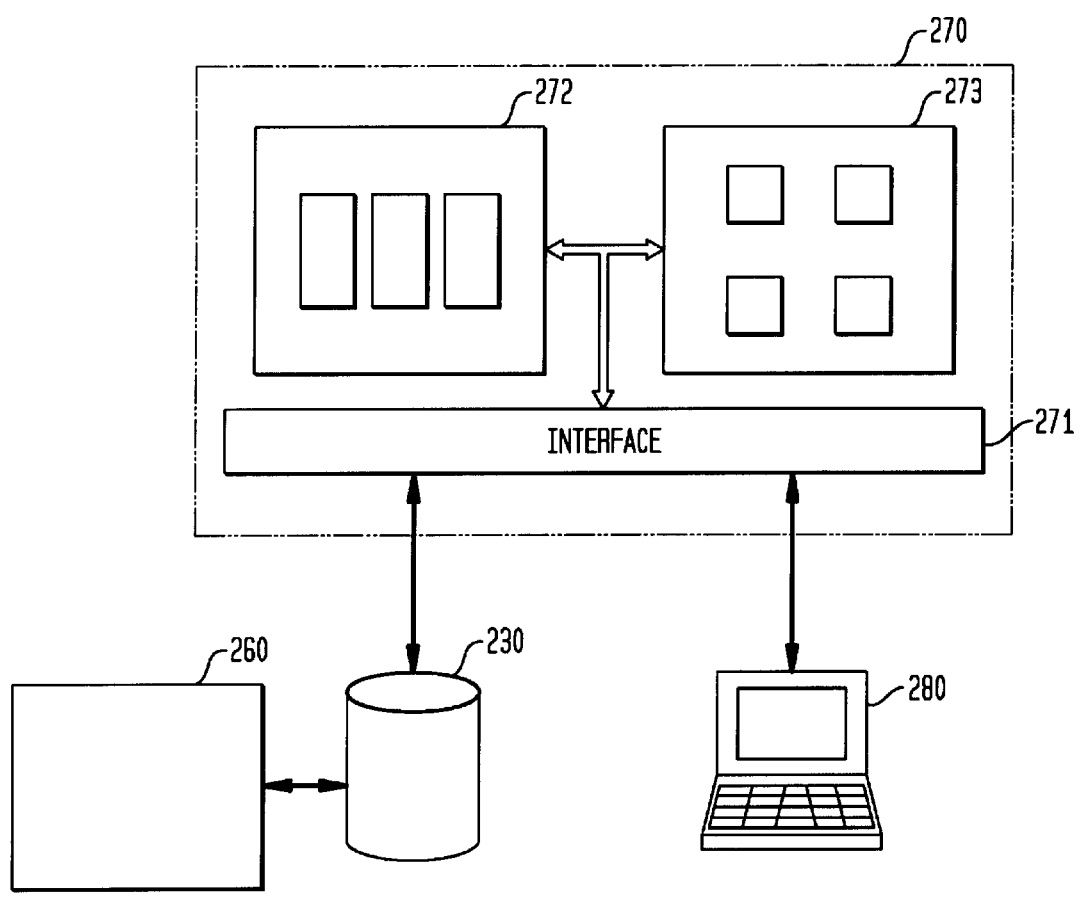
FIG. 9 illustrates a system for reconstructing novel views from the captured images.

FIG. 9 illustrates an exemplary system for processing captured data and for reconstructing novel views from the captured images, as in steps 12–16 of FIG. 1A. As shown in FIG. 8, control device 260 is connected to data storage device 230. The data storage device 230 is also connected to reconstruction processing device 270 via input/output interface 271. In an exemplary embodiment, the reconstruction-processing device 270 includes multiple processors and caches. The set of caches 272 is connected to the input/output interface to load images and other data stored in storage device 230. The caches 272 are connected to the set of microprocessors 273 in the reconstruction-processing device 270. The microprocessors 273 output the reconstructed images to a user terminal 280 via interface 271.

As previously stated, in an exemplary embodiment of the Plenoptic Stitching algorithm, reconstructed images can be generated using either a planar or cylindrical image projection (among other types of possible image projections). In an exemplary embodiment using omnidirectional camera 210, each new column of pixels is reconstructed from a pair of radial lines of pixels extracted from the captured omnidirectional images. Therefore, the preprocessing and stitching phases are described below in terms of mapping and reconstructing image columns from radial lines of pixels.

Pose Estimation

In step 12 of FIG. 1A, the pose estimation algorithm may be executed in any of the control device 260, the frame-grabbing unit 220, or the reconstruction processing device 270. The pose estimation algorithm may also be executed during, or after, image capture. In an exemplary embodiment, the position and orientation of the camera 210 is determined according to the technique described in both U.S. Provisional Application No. 60/294,061, filed May 29, 2001, the contents of which are hereby incorporated by reference in its entirety, and the paper "Accurate Catadioptric Calibration for Real-time Pose Estimation in Room-size Environments," D. Aliaga, *IEEE International Conference on Computer Vision* (ICCV '01), July 2001, pp. 127–134.

This pose estimation technique uses beacons, such as 250a and 250b, to compute camera pose according to a camera calibration scheme and beacon-based pose estimation algorithm for omnidirectional cameras. Each beacon 250a, 250b comprises a post equipped with small bright light bulbs, and these posts are placed in two corners of the trackable region 1. It should be noted that the beacons 250a, 250b are not limited to posts equipped with light bulbs, and may comprise any visibly discernible environment feature. The distance between the posts is measured, and the camera 210 is calibrated approximately parallel to the ground, at a chosen height. Before each sequence of images is recorded, an operator initializes the pose estimation procedure by identifying the projections of the light bulbs in the first captured image. Then, the pose estimation algorithm applies well-known image processing techniques to track the light bulbs from image to image and, using a triangulation technique, derives the camera position (x, y) and the orientation ($\omega$). According to an exemplary embodiment, B-splines are fitted to the camera positions along the image paths in order to compensate for noise in the pose estimation. Then, the local average translation speeds are computed, and the camera positions are re-projected onto the spline curve.

While the above description provides an exemplary method of computing the camera position and orientation, it should be noted that the present invention is not limited to this particular method., Any method for calculating or estimating camera position and orientation, as contemplated by those ordinarily skilled in the art, may be used in connection with the present invention.

Creating Image Loops and Tracking Features

In step 14 of FIG. 1A, the reconstruction device identifies all image loops 70 based on the computed image positions of step 12. Image path intersections may be computed using Oriented Bounding Box (OBB) trees, as discussed in S. Gottschalk et al., "OBBTree: A Hierarchical Structure for Rapid Interference Detection," *Computer Graphics* (SIGGRAPH '96), which is hereby incorporated by reference in its entirety. In an exemplary embodiment, the OBB tree is constructed for each image path 50 by surrounding the entire path by an oriented bounding box. The path segment in the box is then subdivided into two segments, each segment being surrounded by a new oriented bounding box, thereby creating a hierarchy of oriented bounding boxes. The subdivision continues until a small number of images remains in each segment. Intersections between two paths are determined by intersecting their corresponding OBB trees top down and finding the intersecting line segments in the leaf nodes of the tree by enumeration. Other path intersection schema may also be used as is readily apparent to those of ordinary skill in the art.

As illustrated in step 14 of FIG. 1A, after the image loops 70 are defined, the reconstruction-processing device 270 selects the image loop containing the observer viewpoint and identifies the features to be mapped for the chosen image loop 70. During this process, an arbitrary image in the loop is chosen and well-known image processing techniques are used to select a set of visibly discernible environment features (e.g., points and corners). A well-known algorithm is then employed to sequentially track the selected features to the other images captured along the image loop 70. Only those features that successfully track all the way around the loop 70 are retained. Suitable image processing techniques and tracking algorithms for these tasks are described in C. Tomasi and T. Kanade's paper, "Detection and Tracking of Point Features," Carnegie Mellon University Technical Report CMU-CS-91-132, 1991, which is hereby incorporated by reference in its entirety. A "freeware" application, which implements Tomasi and Kanade's method can be obtained on the Internet at <http://vision.stanford.edu/~birch/klt>. The results of feature tracking may be stored in a data structure associated with each image.

Image Reconstruction

Figure 1B:
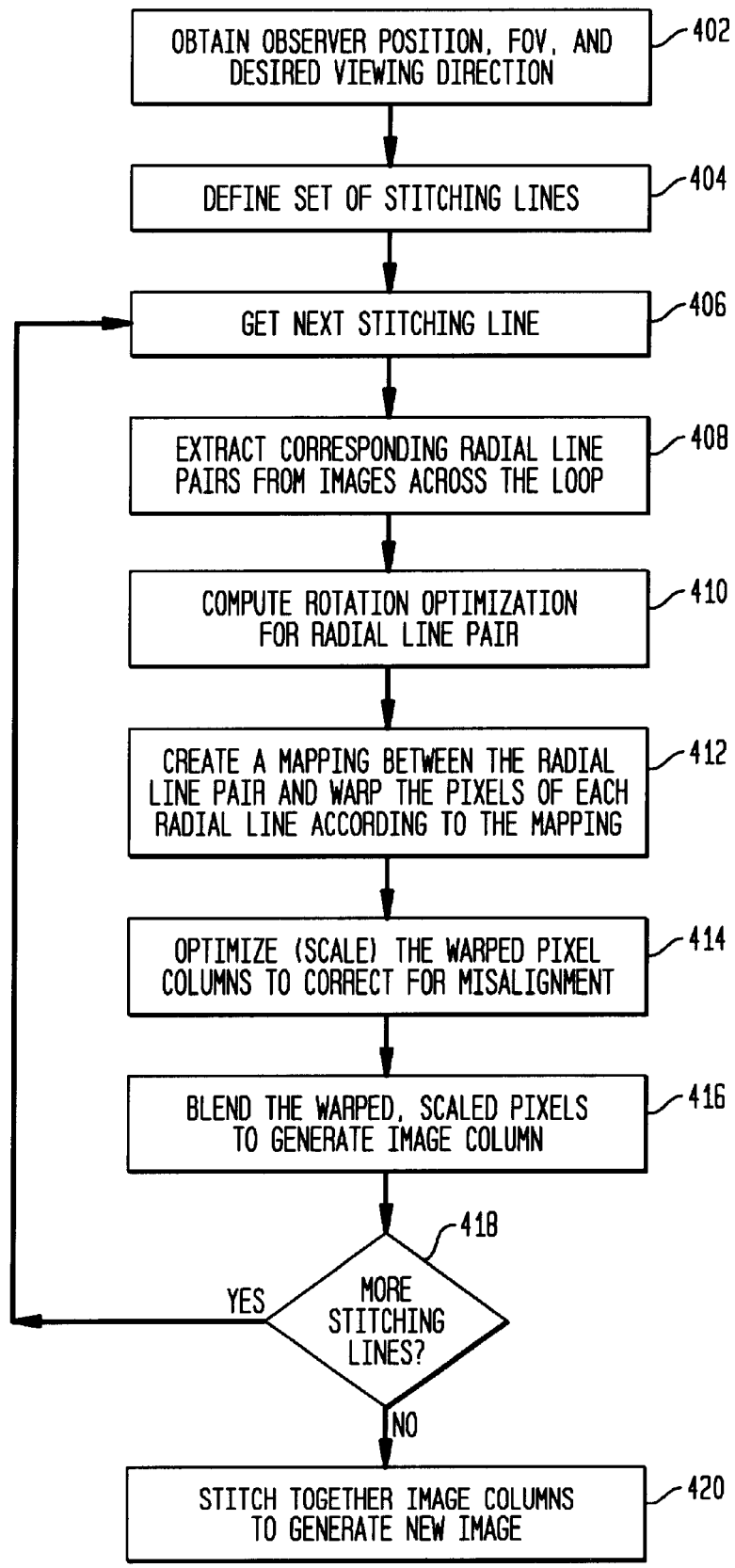
FIG. 1B is a flowchart illustrating the process of stitching together a novel image.

FIG. 1B illustrates a detailed description of the steps performed during step 16 of FIG. 1A. This step generates a novel view of the environment 1 from the observer's vantage point. In step 402, the reconstruction-processing device 270 uses the viewpoint, desired viewing direction, and field-of-view of the user or observer obtained from user terminal 280 (see FIG. 9). The user terminal 280 may include any type of input device suitable for obtaining such data from the user.

The reconstruction-processing device 270 orthographically projects the viewing frustum of the observer onto the observer plane, and a set of Stitching lines are defined through the viewpoint and spanning the extent of the viewing frustum projection, as indicated in step 404. The reconstruction-processing device 270 then selects the next unprocessed Stitching line in step 406, and extracts the two radial lines of pixels associated with the Stitching line in step 408.

In step 410, an optimization algorithm is performed on the pairing of extracted radial lines. In a practical system, both the camera pose estimation algorithm and the feature tracking algorithm introduce errors that cause a non-optimal pairing of radial lines. The optimization uses epipolar geometry to generate an array of rotation corrections to find an optimal set of pairings. The optimization algorithm of step 410 is described in more detail below in the section Rotation Optimization below.

In step 412, the reconstruction-processing device 270 generates a mapping between the extracted radial lines of pixels and warps the pixels to the imaging surface of the observer viewpoint (e.g., columns).

In step 414, another optimization is performed on each pair of warped columns. Misalignment between the two warped columns of pixels may be caused by various factors, including feature drifting, lack of sufficient features, and inaccurate distance estimation between omnidirectional images. In the absence of such errors, the pixel samples of the two warped columns computed from the mappings should be aligned. This optimization step compensates for inaccuracies by scaling one column of pixels relative to the other. A more detailed description of this step is provided in the section Column Correlation below.

The warped and scaled pixel columns are then blended in step 416 creating a column of pixels of the new reconstructed image. The blending step is well understood to those of ordinary skill in the art. Afterwards, decision block 418 determines whether there are more Stitching lines to be processed. If so, stitching returns to step 406, and if not, the reconstructed image is displayed in step 420 by "stitching together" these newly generated image columns on the imaging surface, i.e., by displaying these image columns side-by-side.

Reconstruction Details for One Strip of Pixels

Mapping a New Image Column from Tracked Features

Figure 6:
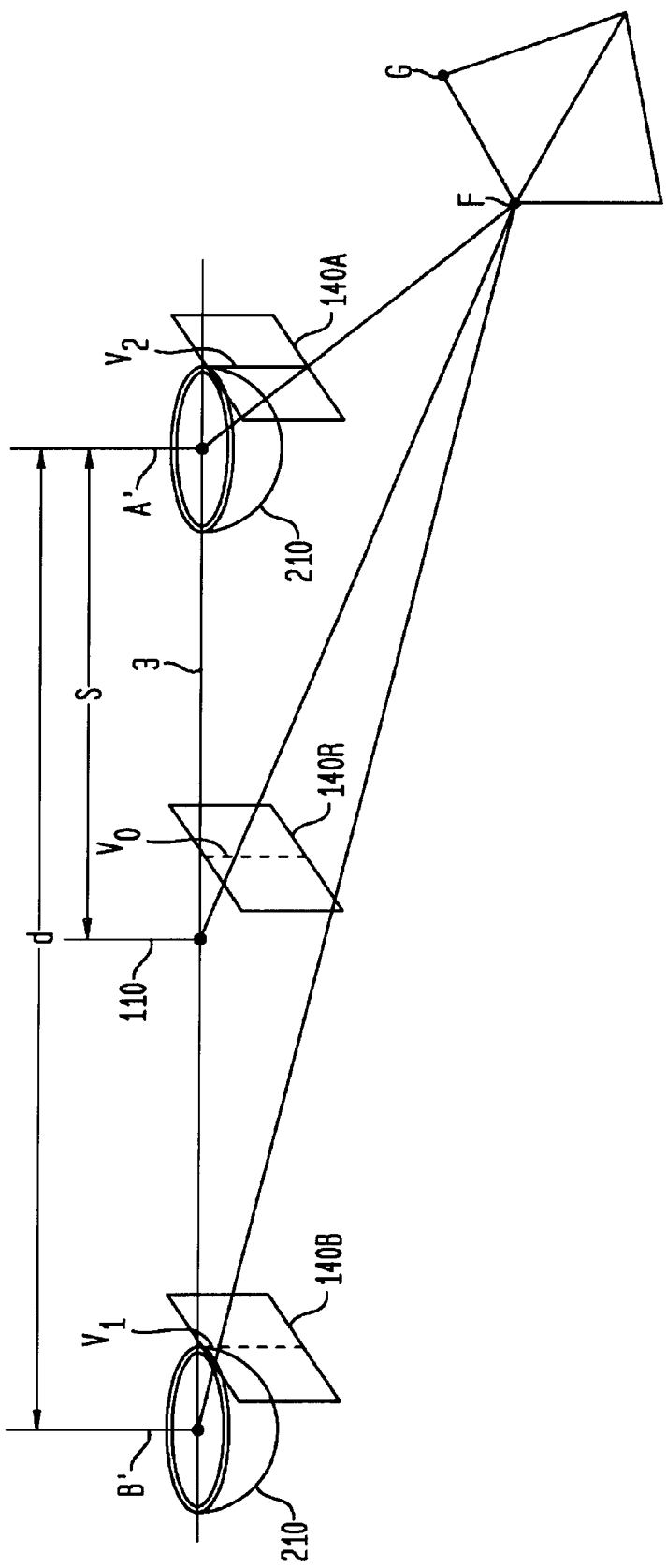
FIG. 6 illustrates a side view of the image loop depicting an omnidirectional camera at opposite ends of the loop and a viewpoint near the middle of the loop.

FIG. 6 illustrates a side view of an image loop 70 depicting the omnidirectional camera 210 at positions A' and B' on opposite ends of the loop. Positions A' and B' represent the intersections of a Stitching line segment 3 and the image loop 70. Radial lines are extracted from the two captured images whose COPs are located (or most closely located) at A' and B', respectively. These radial lines sample the same strip of the environment but from two COPs (A' and B'). The projection surfaces 140A, 140B of the images are shown, as well as the projection surface 140R of the image being reconstructed at viewpoint 110. In FIG. 6, planar projection surfaces are assumed for purposes of illustration only.

Generally, a Stitching line segment 3 will not intersect the image loop 70 exactly at the COP of an omnidirectional image. When this occurs, two radial lines may be extracted for one intersection. For example, if none of the captured images has a COP at point A' of FIG. 6, the two images whose COPs are closest to point A' may be chosen. Then, a radial line, which parallels line segment 3, may be extracted from each of these images. The two radial lines are then blended together to form a single radial line of pixels.

In addition, there is generally not a radial line in every captured image exactly parallel to line segment 3. Hence, in an exemplary embodiment, when no radial line is exactly parallel, the two radial lines that are nearest to being parallel to line segment 3 may be blended to form the extracted radial line for each captured image.

FIG. 6 shows a tracked image feature F (e.g., a corner), whose position $v_0$ within a column of pixels on image surface 140R is determined according to the position of the same feature in an image column of the image at A' and an image column of the image at B'. Specifically, the position $v_0$ is calculated using similar triangles. The projected position of this feature within the columns of the omnidirectional images at B' and A' are respectively designated as $v_1$ and $V_2$. The viewpoint 110 has a parametric position s, which is a value in the range 0 ... 1, and which is a function of the distance d between the COPs of the omnidirectional images at points A' and B'. The value of $v_0$ can be obtained by the following equation:

$$v_0 = v_2 \Big/ s\Big(\frac{v_2}{v_1} - 1\Big) + 1 \qquad \text{Eq. 1}$$

The algorithm uses the set of tracked image features to create a mapping between segments of each radial line pair. In general, tracked features, such as F, are not necessarily present in all radial lines of pixels. For the omnidirectional camera 210, the algorithm triangulates the tracked features in the omnidirectional image. The features used to map segments of one radial line to the other radial line of the pair are the intersections of the triangulation edges of the tracked features with the radial line of pixels.

For a paraboloidal mirror 215, as contemplated in an exemplary embodiment of the invention (shown in FIG. 8), straight lines in the environment project to curves. These curves are in fact arcs of circles. Accordingly, for each omnidirectional image, a Delaunay triangulation of the tracked features is computed, where arcs replace straight triangle edges. Each arc has the property that it passes through the two vertices of the original edge, and intersects the border of the mirror 215 at two points, 180 degrees apart. To compute the circle ($c_x$, $c_y$) containing the arc, the two vertices of the original triangulation edge are transformed to a canonical space, where the captured image has a radius equal to one, and the vertices are rotated so that one of them lies along the x-axis.

Figure 7A:
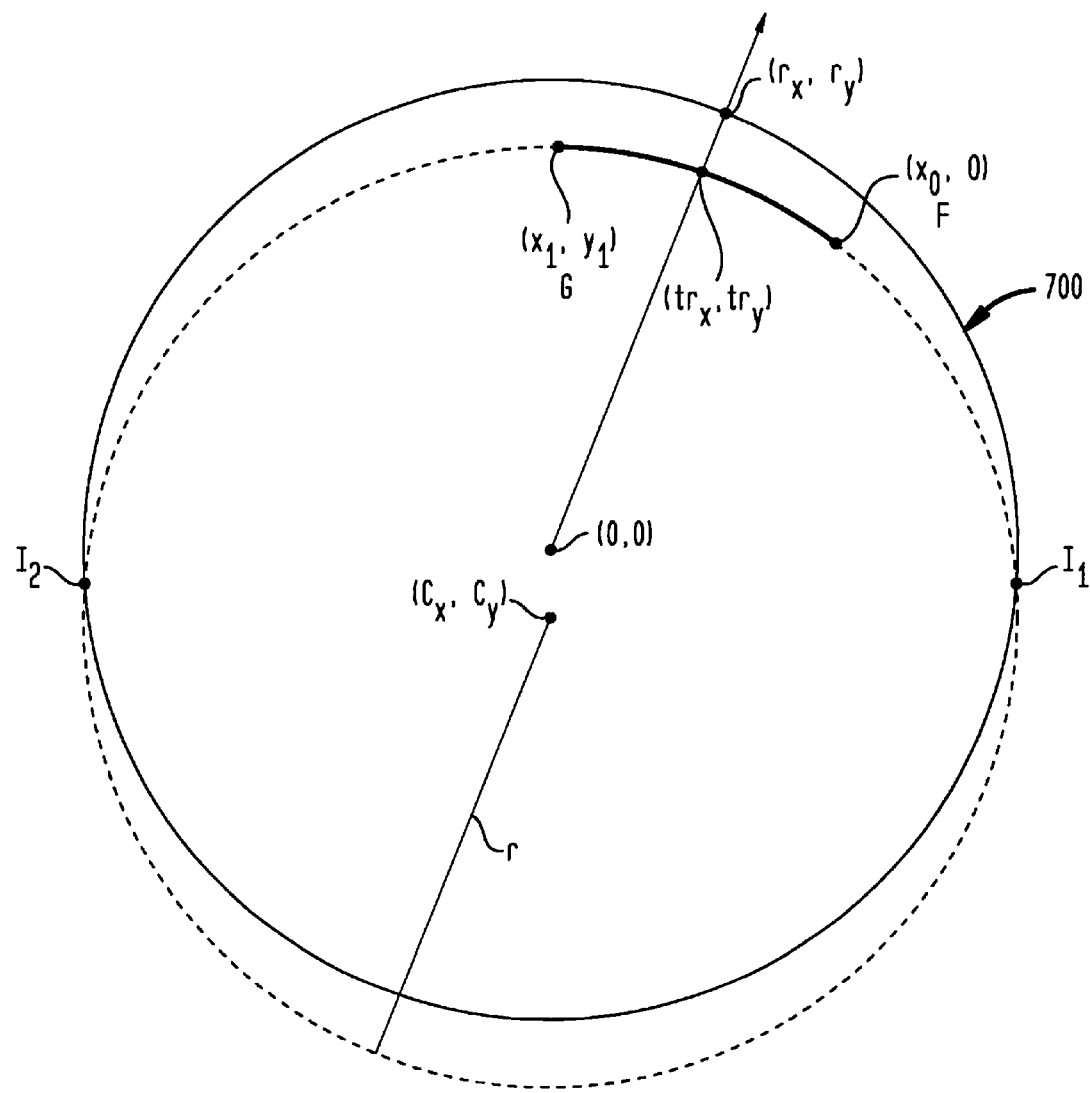
FIG. 7A illustrates the projection of straight lines of the environment as arcs in an omnidirectional image having a hemispherical field of view.

FIG. 7A illustrates an omnidirectional image 700, in which the edge FG of an object in the environment is projected to an arc in the omnidirectional image. The vertices of the edge, i.e. F and G, are represented in the canonical space by ($x_0$, 0) and ($x_1$, $y_1$). The following expressions compute the circle in canonical space at ($c_x$, $c_y$) of radius r, which passes through the two vertices and intersects the mirror border at points $I_1$, $I_2$, 180 degrees apart:

$$c_x = \frac{x_0^2 - 1}{2x_o}$$

$$c_y = \frac{x_1 - x_0 + x_0(x_1^2 + y_1^2) - x_0^2 x_1}{2x_0 y_1}$$

$$r = \sqrt{1 + c_x^2 + c_y^2}$$

Eq. 2

The point of intersection ($tr_x$, $tr_y$) in the canonical space of a radial line from the image origin to a point on the image border ($r_x$, $r_y$) with an arc-edge can be computed by solving for t in the following quadratic equation:

$$(r_x^2 + r_y^2)t^2 - 2(c_x r_x + c_y r_y)t + (c_x^2 + c_y^2 - r^2) = 0$$

Eq. 3

It should be noted that for each pair of radial lines, mappings may be generated for both directions of the corresponding line segment 3 illustrated in FIG. 6. In other words, a mapping can be generated for radial line at B' to A' and another one for mapping the radial line at A' to B'. Since corresponding edges of the triangulation of the features in each image are not guaranteed to be present in both images, this will yield two slightly different mappings. Either or both of the mappings can be used for the radial line pair. Preferably the mapping from A' to B' should be used to map the radial line from A' to viewpoint 110 and, similarly, the mapping from B' to A' should be used to map the radial line from B' to viewpoint 110.

Rotation Optimization

Figure 7B:
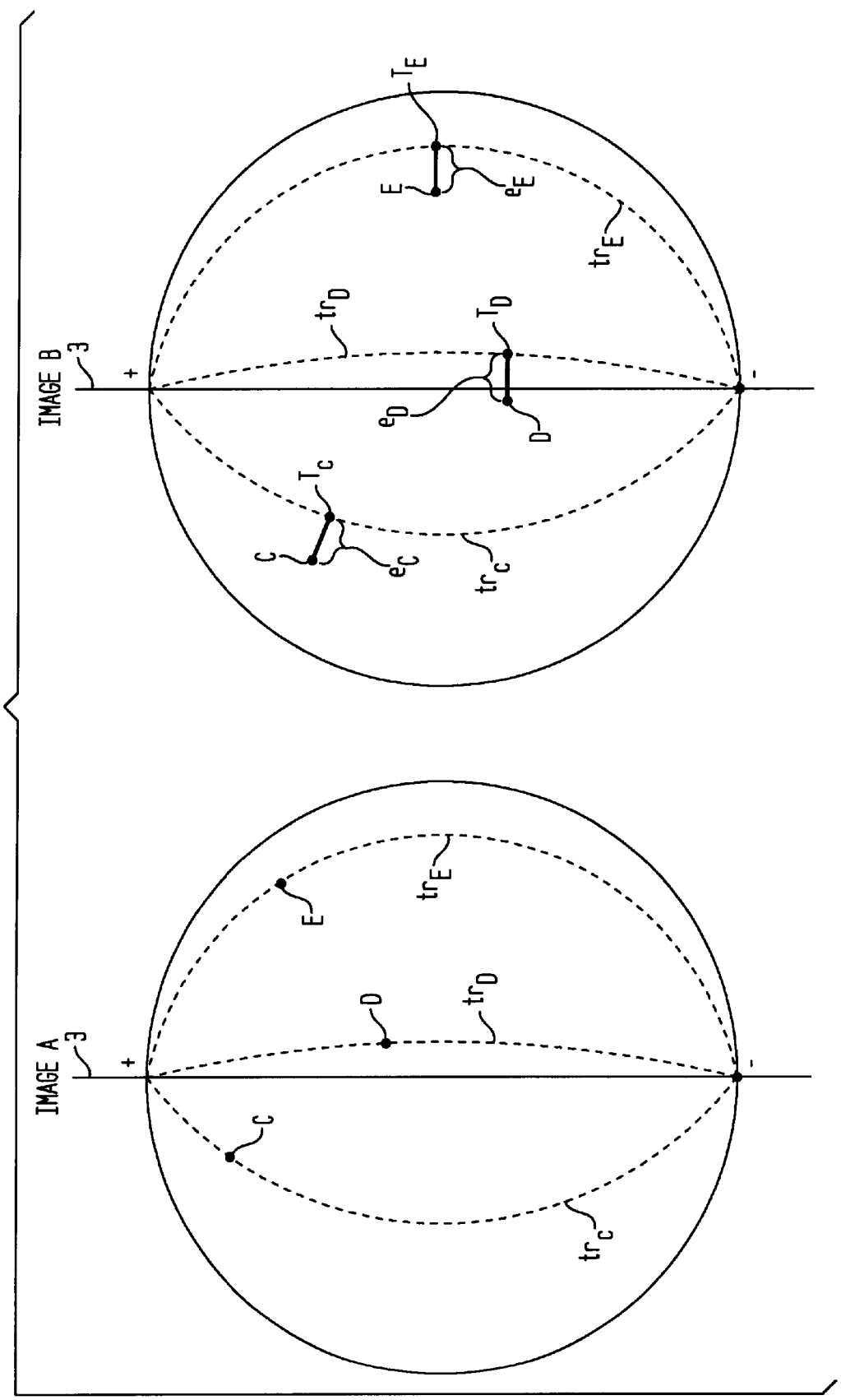
FIG. 7B illustrates rotation errors occurring between a pair of radial lines from two omnidirectional images.

FIG. 7B illustrates errors resulting from the non-optimal pairing of radial lines from two omnidirectional images from opposite sides of the loop. This figure depicts two omnidirectional images, IMAGE A and IMAGE B, intersected by a Stitching line segment 3. Further, feature points C, D, and E are depicted in both IMAGE A and IMAGE B. Moving the viewpoint 110 along the line segment 3 from the COP of IMAGE A towards the COP of IMAGE B, the positive and negative epipoles of the images lie on the intersections of line segment 3 and the border of the omnidirectional images. Similarly, the line segment 3 defines the positive and negative epipoles in the reconstructed image.

According to the epipolar geometry of omnidirectional camera 210 and assuming no rotation errors, each feature moves along the arc of a circle that intersects the positive epipole, the negative epipole, and the feature itself. Equation 2 gives the trajectory for a feature in IMAGE A using each feature and an epipole to define the arc-edge. If the two omnidirectional images IMAGE A and IMAGE B were rotationally aligned, features C, D, and E would move along such arcs, and appear in the reconstructed image on the corresponding arcs. These expected trajectories of features C, D, and E are labeled $tr_C$, $tr_D$, and $tr_E$, respectively.

However, FIG. 7B shows an instance where IMAGE A and IMAGE B are not rotationally aligned. Each feature C, D, E in IMAGE B is offset from its respective circle $tr_C$, $tr_D$, $tr_E$, by a distance $e_C$, $e_D$, $e_E$, calculated in pixels. Each of these distances $e_C$, $e_D$, $e_E$ represent the error of the corresponding feature. The total error in alignment can be represented by the sum of the squared differences between the features and their expected trajectories.

The reconstruction-processing device 270 performs an optimization to minimize the total rotation error by calculating a rotation correction $f_i$, one for every Stitching line. Specifically, for each Stitching line, the reconstruction-processing device 270 retrieves the corresponding omnidirectional images from the data storage device 230, and calculates a rotation correction $f_i$ for IMAGE B and stores it with IMAGE A. This is done for all Stitching lines through IMAGE A. Next, a smoothing operation may be performed over IMAGE A's correction values. This smoothing operation may be performed by convolving a low-pass convolution filter over the array of $f_i$ values of the entire image. Each time a Stitching line intersects an IMAGE A, the rotational correction of the corresponding radial line is added to IMAGE B's orientation prior to extraction of IMAGE B's radial line.

The reconstruction-processing device 270 calculates the array of rotation corrections $f_i$ using the method of least squares. Assume that each omnidirectional image includes n=1 ... N tracked features $F_1$ ... $F_N$. For each pair of retrieved omnidirectional images, one of the images is assumed to be aligned correctly (e.g., IMAGE A in FIG. 7B). The feature trajectories $tr_1$ ... $tr_N$ of the correctly aligned image are determined according to Equation 2 above. The set of feature errors $e_1$ ... $e_N$ in IMAGE B are then calculated as the distance between the positional coordinates of each feature $F_1$ ... $F_N$, and its closest corresponding position $T_1$ ... $T_N$ on the expected trajectory $tr_1$ ... $tr_N$. The rotational correction $f_i$ for the orientation of the second image of this radial line pair is calculated to minimize the error (the sum-of-squared feature errors), which is expressed as:

$$(F_1 - T_1)^2 + (F_2 - T_2)^2 + \ldots + (F_N - T_N)^2 = \sum_{n=1}^{N} [F_n - T_n]^2$$

Eq. 4

Column Correlation

To improve alignment for each pair of warped columns, one of the warped columns is scaled, while the other is left unchanged. One method for determining the scale factor is to iterate over various scale values and to correlate the resulting two columns using low-pass filtered and down-sampled versions of the columns, as described in *Three-Dimensional Computer Vision: A Geometric Viewpoint* by O. D. Faugeras, MIT Press, Cambridge, Mass., 1993, which is hereby incorporated by reference in its entirety. The scale factor that generates the column pair with the highest correlation value is chosen. Subsequently, a smoothing operation may be performed on the scale values. This smoothing operation may be performed by convolving the array of scale values, one for each column, for the entire reconstructed image with a low-pass filter convolution kernel.

Blending

Once column correlation is performed for each pair of warped columns, the pixels are blended together to form a column of the new image, using processing techniques well known to those of ordinary skill in the art.

Display

The reconstruction-processing device 270 renders each view on a display device located at the user terminal 280. Such display device 270 may comprise a computer monitor, television display, projection display, virtual reality headgear, or any other display device suitable for walkthrough applications. The image is displayed by "stitching together" these newly generated image columns, i.e., by displaying these image columns side-by-side.

Preprocessing and Run-time Processing

In order to obtain real-time performance in an exemplary embodiment, the stitching process may be partitioned into a preprocessing phase and a run-time phase.

During the preprocessing phase, some of the steps of FIG. 1B may be performed for a collection of Stitching lines and the results may be stored in a data structure. This data structure may be used at run-time of an interactive walkthrough application to obtain the mapping information for the Stitching lines of the current novel view to reconstruct.

Figure 1C:
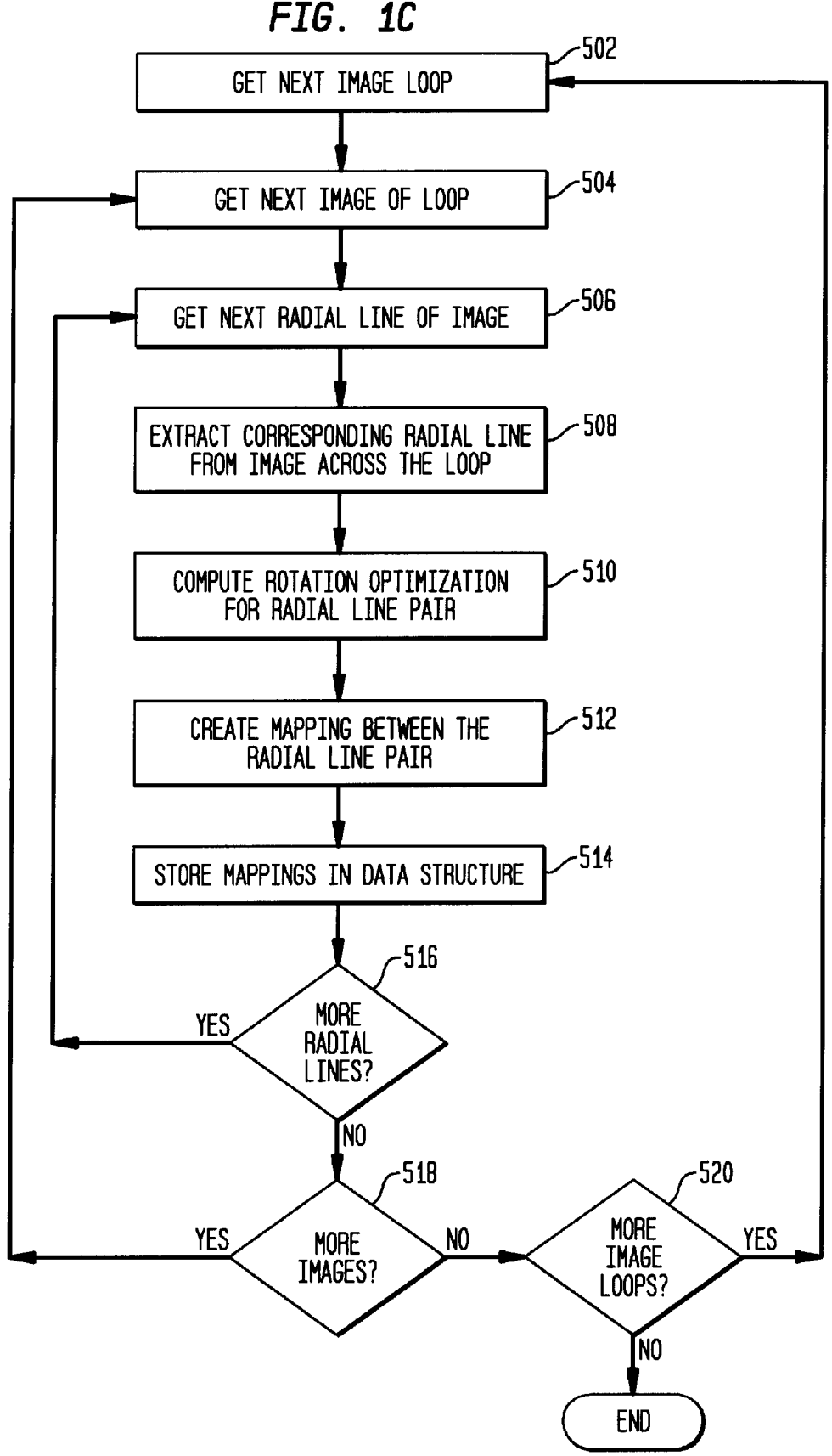
FIG. 1C is a flowchart illustrating an exemplary preprocessing phase of stitching together a novel image.

FIG. 1C illustrates the implementation of a preprocessing phase, according to an exemplary embodiment of the present invention. Using the previously described omnidirectional camera, the reconstruction-processing device 270 may sequentially go through all image loops 70 (step 502) and sequentially select each image of a loop (step 504). For each selected image, the preprocessing phase may sequentially select each radial line of pixels (step 506). For each radial line of pixels a Stitching line is extended from the center-of-projection of the omnidirectional image along the radial line to the other side of the loop 70. From the image closest to the intersection point of the Stitching line and the other side of the loop, the radial line closest to be being parallel to the Stitching line is selected in step 508. In step 510, the rotation optimization algorithm described above is performed on the selected pair of radial lines. A mapping function is created in step 512, and stored in a data structure according to step 514. This data structure may be indexed by Stitching lines thus allowing for easy retrieval of information during run-time. The mapping functions are not used to create new columns of pixels until the associated Stitching lines are needed at run-time. Decision step 516 determines whether there are any more radial lines in the selected image of step 504—if so, processing returns to step 506. If there are no more radial lines to be processed in the selected image, decision step 518 determines whether there are any more images in the image loop 70. If there are more images, processing returns to step 504; if not, step 520 determines whether any more image loops 70 need to be processed. If there are more loops 70 to process, then step 502 is performed. Otherwise, the preprocessing algorithm of FIG. 1C is concluded.

During the run-time phase, the reconstruction-processing device may load from storage device 230 the data structure storing the aforementioned mapping functions and perform the remaining reconstruction steps of FIG. 1B, including warping of pixel columns (step 414), optimization to correct column misalignment (step 416), and blending the warped and scaled columns.

The preprocessing and run-time phase described above is by no means the only way the steps of FIG. 1B can be partitioned to increase processing speed and efficiency. Other strategies exist to partition the workload and to accelerate the implementation of an exemplary embodiment, as should be obvious to those of ordinary skill in the art. Moreover, preprocessing and run-time phases also exist for other types of omnidirectional cameras.

The reconstruction-processing device 270 may contain multiple processors 273. In that case, the preprocessing and run-time work can be distributed across the processors.

The captured image data and generated data structures may be compressed and stored in data storage device 230. In such an embodiment, the images may be compressed using JPEG compression, while Lempel-Ziv compression may be performed on the data structures. Both of these compression techniques are well known to those of ordinary skill in the art. For instance, in an exemplary embodiment of the invention, JPEG compression is efficiently used by re-projecting the captured images to cylindrical projections.

The reconstruction-processing device 270 may also include multiple caches 272 for dynamically loading the images and the reconstruction data structures. In an exemplary embodiment, two caches 272 are used for image data: one cache stores the compressed images already loaded from the data storage device 230, the other stores decompressed image subsets. The third cache is used dynamically load, decompress, and store the remaining data structures. All three caches may be set to use a least recently used (LRU) replacement policy.

Several suitable reconstruction-processing devices may be used. For instance, a Silicon Graphics (SGI) Onyx2 system or a personal computer (PC) equipped with the necessary hardware devices.

The reconstruction processing device 270 is in no way limited to this configuration, and may include any configuration of hardware, or combination of hardware and software, as will be contemplated by one of ordinary skill in the art for reconstructing 4D plenoptic functions and producing interactive walkthroughs according to the present invention.

In a further exemplary embodiment, view reconstruction may be accelerated during the execution of the interactive walkthrough by using fewer mappings than columns in the reconstructed image. In this embodiment, the pixels may be warped using lower-resolution information.

The invention being thus described, it will be obvious that the same may be varied in many ways. Such variations are not to be regarded as a departure from the spirit and scope of the invention, and all such modifications as would be readily apparent to one skilled in the art are intended to be included within the scope of the following claims.

We claim:

1. A method of generating images of an environment comprising:

stitching together image data obtained at multiple points along boundaries of an image loop to generate an image for a viewpoint within the boundaries of the image loop, the boundaries of the image loop formed by intersecting image paths within the environment, the viewpoint and the image loop being on an observer plane.

2. The method of claim 1, wherein the image data is obtained by, capturing images, each having a center-of-projection of known position and orientation, along intersecting paths within the observer plane, the intersecting paths defining boundaries of at least one image loop.

3. The method of claim 1, wherein the stitching step comprises:

defining an array of line segments through the viewpoint corresponding to a field-of-view (FOV) from the viewpoint, each line segment of the FOV lying on the image plane and intersecting the image loop; and combining, for each line segment of the FOV, data from the images of the loop.

4. The method of claim 3, wherein each line segment is a stitching line.

5. The method of claim 3, wherein the combining step includes, extracting, for each line segment, strips of pixels from the image data, each strip of pixels being extracted from the images recorded along the boundaries.

6. The method of claim 5, wherein the extracting step for a strip of pixels at an intersection of a line segment with the boundary of the image loop includes, obtaining two captured images on the boundary of the image loop closest to the intersection point;

for each of the two captured images, obtaining two strips of pixels, which are closest to being parallel to the line segment; and blending the two strips of pixels to produce a single extracted strip of pixels;

blending the extracted strips of pixels from each of the two captured images to produce a single strip of pixels for the intersection of the line segment with the boundary of the image loop.

7. The method of claim 5, wherein the extracting step extracts the strips of pixels from omnidirectional images recorded along the boundaries, each omnidirectional image having a 360° horizontal FOV of the environment and an effective center-of-projection.

8. The method of claim 5, wherein the extracting step extracts the strips of pixels from separate images recorded along the boundaries, and each strip of pixels recording light rays corresponding to a sample of the environment perpendicular to a plane of the image loop and viewed from a center-of-projection on the image loop plane.

9. The method of claim 5, wherein the combining step combines the extracted strips of pixels according to a mapping, which correlates identified environment features within the images recorded along the boundaries of the loop.

10. The method of claim 9, wherein the identified environment features include those features located outside the image loop, whose projection onto each image recorded along the boundaries is successfully tracked.

11. The method of claim 3, wherein the combining step comprises:

extracting a first image from the images recorded along the boundaries, the first image having a center-of-projection located approximately at a first intersection point of the line segment with the boundaries of the image loop;

extracting a second image from the images recorded along the boundaries, the second omnidirectional image having a center-of-projection located approximately at a second intersection point of the line segment with the boundaries of the image loop;

extracting a strip of pixels from each of the first and second images;

establishing a mapping, which correlates identified environment features within the first and second images recorded along the boundaries;

computing a parametric position of the viewpoint along the line segment; and creating a strip of pixels for a novel viewpoint by warping and blending the extracted strips of pixels of the first and second omnidirectional images according to the parametric position and the mapping.

12. The method of claim 11, wherein the generated image comprises one of a planar projection and cylindrical projection;

and the creating step creates the strip of pixels as an image column.

13. The method of claim 11, wherein the creating step includes, optimizing at least one of the extracted strips of pixels to correct errors resulting from at least one of the following: incorrectly estimated image rotation, and misalignment of image features.

14. A method of generating an image comprising:

creating a four-dimensional plenoptic function based on samples of the environment, the plenoptic function including a plurality of coefficients representing the intensity of light rays arriving at an observer located at a two-dimensional point (x, y) of the observer plane, the light rays intersecting a secondary surface at (u, v), and the coefficients being indexed according to the observer plane point (x, y) and the secondary surface point (u, v) wherein the creating step includes defining the secondary surface to be a surface, which is perpendicular to the observer plane, and which surrounds a visually unobstructed area of the observer plane in the environment; and generating an image from the plurality of coefficients.

15. A method for generating an image of a three-dimensional environment in a computer-implemented interactive walkthrough application stored in a computer-readable storage device, comprising:

inputting a viewpoint and orientation;

selecting a predefined image loop containing the viewpoint, boundaries of the image loop being defined according to a set of intersecting paths along which images have been captured in the environment;

retrieving, from a computer-readable storage device, images captured along the boundaries of the determined image loop; and generating an image corresponding to the viewpoint and orientation by combining pixels of the retrieved images according to a four-dimensional plenoptic function representing the intensity values of light rays emanating to the viewpoint.

16. The method of claim 15, wherein the plenoptic function includes a mapping for each of a plurality of line segments intersecting the viewpoint, each mapping identifying light rays emanating to the viewpoint.

17. The method of claim 16, wherein the generating step includes, extracting two strips of pixels from two separate images captured along the boundaries of the image loop; and warping and blending the two extracted strips of pixels to produce a single extracted strip of pixels based on the mappings of the plenoptic function.

18. The method of claim 16, further comprising, computing and storing the mappings in the computer-readable storage device, said computing and storing steps being performed prior to the inputting step.

19. The method of claim 18, wherein the step of computing a mapping comprises:

selecting, for each image captured along the boundaries of the image loop, a set of strips of pixels; and for each selected strip of pixels, extracting a strip of pixels from a separate image captured along the boundaries of the selected image loop, the extracted strip of pixels being substantially parallel to the determined strip of pixels, and establishing correlating identified environmental features within the selected strip of pixels and the extracted strip of pixels.

20. An apparatus for generating an image of a three-dimensional environment comprising:

means for determining a viewpoint and orientation within the environment; and means for stitching together image data obtained at multiple points along boundaries of an image loop containing the viewpoint in order to generate an image corresponding to the viewpoint and the orientation, the boundaries of the image loop formed by intersecting image paths within the environment, the viewpoint and the image loop being on an observer plane.

21. The apparatus of claim 20, wherein the means for stitching includes, a data storage device for storing image data of the environment captured along the boundaries of the image loop;

means for generating a mapping for each of a plurality of line segments intersecting the viewpoint, each mapping correlating environment features within the image data.

22. The apparatus of claim 21, wherein the means for stitching further includes, means for defining a plurality of line segments extending through the viewpoint, each line segment intersecting the image loop;

means for storing the generated mapping in the data storage device;

means for retrieving from the data storage device, for each line segment, a mapping; and means for generating a strip of pixels corresponding to the line segment by combining pixels from the stored image data according to the mapping.

* * * * *